United States Patent
Mol

(10) Patent No.: US 9,018,944 B2
(45) Date of Patent: Apr. 28, 2015

(54) HALL-EFFECT SENSOR ARRANGEMENT

(75) Inventor: Hendrik Anne Mol, Sleeuwijk (NL)

(73) Assignee: Aktiebolaget SKF, Gothenburg (SE)

( * ) Notice: Subject to any disclaimer, the term of this patent is extended or adjusted under 35 U.S.C. 154(b) by 59 days.

(21) Appl. No.: 13/383,480

(22) PCT Filed: Jul. 15, 2009

(86) PCT No.: PCT/EP2009/005142
§ 371 (c)(1),
(2), (4) Date: Jan. 11, 2012

(87) PCT Pub. No.: WO2011/006515
PCT Pub. Date: Jan. 20, 2011

(65) Prior Publication Data
US 2012/0105057 A1    May 3, 2012

(51) Int. Cl.
| | |
|---|---|
| *G01B 7/30* | (2006.01) |
| *G01R 33/07* | (2006.01) |
| *G01D 5/14* | (2006.01) |
| *G01P 3/44* | (2006.01) |
| *G01P 3/487* | (2006.01) |

(52) U.S. Cl.
CPC ............... *G01D 5/145* (2013.01); *G01P 3/443* (2013.01); *G01P 3/487* (2013.01)

(58) Field of Classification Search
USPC ............................................. 324/251, 207.25
See application file for complete search history.

(56) References Cited

U.S. PATENT DOCUMENTS

| | | | | |
|---|---|---|---|---|
| 5,627,465 | A  * | 5/1997 | Alfors et al. ............... | 324/207.2 |
| 6,043,643 | A    | 3/2000 | Message et al. | |
| 6,323,641 | B1 * | 11/2001 | Allwine ...................... | 324/207.2 |
| 6,404,185 | B1 * | 6/2002 | Allwine ...................... | 324/207.2 |
| 6,476,600 | B2 * | 11/2002 | Kono et al. ................. | 324/207.2 |
| 7,463,022 | B2 * | 12/2008 | Klode ........................ | 324/207.25 |
| 2001/0048302 | A1* | 12/2001 | Kogure et al. ............. | 324/207.2 |
| 2008/0036451 | A1 | 2/2008 | Klode | |

FOREIGN PATENT DOCUMENTS

| | | |
|---|---|---|
| DE | 19901182 A1 | 7/1999 |
| DE | 102005051067 A1 | 5/2006 |
| EP | 1452834 A1 | 9/2004 |
| JP | 2004258028 A | 9/2004 |

OTHER PUBLICATIONS

SKF Chapter, Mechatronics /Section, Sensor Bearing Units SKF Catalogue 6000, EN Nov. 2005, Germany.

* cited by examiner

*Primary Examiner* — Bot Ledynh
(74) *Attorney, Agent, or Firm* — Bryan Peckjian; SKF USA Inc. Patent Dept.

(57) ABSTRACT

A sensor arrangement is operative to sense a relative kinematic state of a magnet (110) and a Hall-effect sensor (202) with respect to each other. The Hall-effect sensor has a Hall plate (204) and is accommodated in a surface-mount device. The magnet is configured for generating a magnetic field having an orientation primarily parallel to the Hall plate. The sensor arrangement comprises magnetic-field collecting means (206) for changing the orientation of the magnetic field to be primarily perpendicular to the Hall plate.

4 Claims, 4 Drawing Sheets

US 9,018,944 B2

HALL-EFFECT SENSOR ARRANGEMENT

CROSS-REFERENCE

This application is the US national stage of International Application No. PCT/EP2009/005142 filed on Jul. 15, 2009.

FIELD OF THE INVENTION

The invention relates to an apparatus comprising first and second components and a sensor arrangement for sensing a position, a velocity or an acceleration of the first and second components relative to one another using a Hall-effect sensor. The invention also relates to a sensor arrangement for use in such apparatus.

BACKGROUND ART

The following terminology is used in this text. The expression "kinematic state of a physical component" refers to the position, and/or velocity, and/or acceleration of the physical component with respect to some pre-determined reference system. The expression "relative kinematic state of two physical components" refers to the position, and/or velocity and/or acceleration of the physical components relative to each other. The expression "kinematic quantity" is used in this text to refer to a physical quantity representative of the kinematic state.

The relative kinematic state of two physical components can be measured using any of a variety of sensing techniques. An example of a known sensing technique is based on determining the strength of a magnetic field, or a rate of change in the magnetic field strength, as a representative of relative position or of relative velocity of a first physical component relative to a second physical component. Magnetic sensing is an example of a remote sensing technique. That is, it is contactless in that a magnetic sensor arrangement does not introduce any physical contact with the first and second components. As a result, a magnetic sensor arrangement is practically insusceptible to, e.g., the accumulation of dirt on the components, to the presence of lubricants and, if properly designed, to magnetic fields from an external source.

A magnetic sensor typically uses a Hall-effect sensor. A Hall-effect sensor supplies an output voltage, whose magnitude and polarity are representative of the strength and direction of the component of the magnetic field that is orthogonal to the sensor's sensitive part, known as the "Hall plate".

A magnetic sensor arrangement can be physically integrated with a through-shaft bearing. The sensor arrangement is then used to determine, e.g., the angle of rotation between the inner ring and the outer ring of the bearing. If, for example, the inner ring is kept stationary with respect to a shaft, and the outer ring is kept stationary with respect to a frame supporting the shaft, the sensor supplies an output signal indicative of the rotation angle of the shaft around the shaft's axis relative to the frame.

A class of through-shaft sensor-bearing units, manufactured by SKF, is designed for automotive applications to make steering easier and more precise. Based on existing, proven SKF technology focusing on positioning, rotation angle and speed sensing, these sensors are integrated in a bearing positioned on a shaft, from where they transmit data to a standard electronic controller. The controller monitors the desired level of power that the electric servo-motor needs to deliver in order to assist the driver with steering. The sensors enable more precise power-assist steering, from left-lock all through right-lock for all driving conditions, including highway to parking. For more background information see, for example, the "General Catalogue" of SKF, edition 2005, chapter "Mechatronics", section "Sensor-Bearing Units", or U.S. Pat. No. 6,043,643, incorporated herein by reference.

Consider a known example of a through-shaft sensor arrangement integrated with a bearing, and configured for absolute-angle sensing in an automotive steering application. The sensor arrangement comprises a diametrically magnetized bipolar ring. The magnetic field of the ring extends primarily radially in the plane of the ring. The ring is attached to, and turns with, a shaft, whose angular position is to be sensed relative to a stationary component. The sensor arrangement has one or more Hall-effect sensors for sensing the radial component of this magnetic field. The Hall-effect sensors are accommodated at the stationary component. The Hall-effect sensors are positioned around the ring at 90° angular position intervals. The Hall-effect sensors produce output voltages that depend on the magnitudes of the field sensed, which in turn depend on the relative angular position of the bipolar ring relative to the Hall-effect sensors. The output voltages are converted into digital data and subjected to data processing in order to provide an output representative of the angular position of the shaft. The angular position of the shaft and/or its rate of change determine the amount of assistance to be delivered by a servo-motor, possibly in combination with other input quantities such as road speed of the vehicle.

The Hall-effect sensor used is comprised in an electronic device, e.g., with a single-in-line (SIL) package, whose wire leads are soldered to a printed circuit board (PCB). The electronic device accommodating the Hall-effect sensor is of the so-called "through-hole" design, and the wire leads are to be stuck into holes in the PCB before the device can be soldered to the PCB The Hall plate of such a Hall-effect sensor is oriented substantially perpendicular to the PCB.

SUMMARY OF THE INVENTION

The inventor has realized that replacing the Hall-effect sensor devices of the SIL type by those of the surface-mount-device (SMD) type will affect the design of a sensor arrangement. This is explained as follows.

As known, an SMD is an electronic device, whose package is configured for being mounted directly on the surface of a PCB. SMDs are typically much smaller than their functional counterparts of a through-hole design and, moreover, they are much better suited for automated assembly of electronic circuitry on a PCB.

First consider a substrate, e.g., a PCB with mounted thereon a Hall-effect sensor of the through-hole type. The sensitive area (i.e. the Hall plate) of the Hall-effect sensor is oriented perpendicular to the substrate. Now consider a Hall-effect sensor of the SMD type, mounted on the substrate. The sensitive area of a Hall-effect sensor of the SMD-type is now oriented parallel to the substrate. Accordingly, if the through-hole Hall-effect sensors are to be replaced by their SMD counterparts, the sensor arrangement needs to be modified so as to have the magnetic field and the Hall plate of the SMD Hall-effect sensor oriented with respect to one another in a way that enables the Hall plate to sense the magnetic field.

An aspect of the invention relates to an apparatus comprising a first physical component, a second physical component and a sensor arrangement. The sensor arrangement is configured for sensing a relative kinematic state of the first and second physical components with respect to each other. The sensor arrangement comprises a magnet that is stationary with respect to the first physical component, and one or more Hall-effect sensors that are stationary with respect to the second physical component. Each Hall-effect sensor has a Hall plate and is accommodated in an electronic surface-mount device. The magnet is configured for generating a magnetic field having an orientation primarily parallel to the Hall plate. According to the invention, the sensor arrangement comprises magnetic-field collecting means for changing the orientation of the magnetic field to be primarily perpendicular to the Hall-plate at the location of each Hall-effect sensor.

The magnetic-field collecting means provides magnetic flux guidance in that the magnetic-field collecting means bends, as it were, the magnetic field lines towards the Hall plate of the Hall-effect sensor. The magnetic-field collecting means is made from a suitable material with a high relative magnetic permeability $\mu_r$ of greater than 100. Preferably, the magnetic-field collecting means is made from a material with a relative magnetic permeability $\mu_r$ of greater than 300, more preferably greater than 500. An example of such material is a ferritic stainless steel of steel grade AISI 430. This steel has a relative magnetic permeability $\mu_r$ with a value between 1000 and 3000, has a low electrical conductivity of about 6 $\mu\Omega m$, and can be accurately processed by press-forming or deep-drawing.

The magnetic-field collecting means enables the designer to re-use most elements and the form-factor of a conventional sensor arrangement with Hall-effect sensors of the through-hole type, in a design based on Hall-effect sensors of the SMD type. Re-use of a design and of its elements is of importance to, e.g., the manufacturer of the apparatus, the manufacturer of the sensor arrangements, the supplier of the components, etc., as the re-use enables to minimize the costs of migrating from using through-hole elements to using SMD elements.

Also note that it is an advantage if the critical dimension(s) of the form-factor of the sensor arrangement do not change or do not change substantially when replacing a Hall-effect sensor of the through-hole type with one of the SMD type and introducing the magnetic field collecting means. If it did require changes to the critical dimension(s), e.g., its length, width or thickness, the apparatus itself would need to be modified in order to accommodate the modified sensor arrangement, thus increasing costs.

In an embodiment of the apparatus of the invention, the magnet is located in a first plane, the magnetic-field collecting means is located in a second plane parallel to the first plane, and the Hall-effect sensor is located between the first and the second planes, and has the Hall plate substantially parallel to the first plane.

In a further embodiment of the apparatus, the first physical component comprises a shaft that is rotatable around its axis relative to the second physical component. The sensor arrangement is physically integrated with a through-shaft bearing unit mechanically coupling the shaft to the second physical component.

Consider the sensor arrangement physically integrated with a bearing so as to form e.g. a through-shaft sensor-bearing unit. The spatial configuration of the sensor arrangement can be modified, but the modifications that are practically possible are restricted by the (standard) dimensions of the unit and the room available to mount the unit into a piece of machinery. The known through-shaft sensor-bearing unit can be modified by replacing the Hall-effect sensor of the through-hole type by a combination of a Hall-effect sensor of the SMD type and the magnetic-field collecting means, practically without changing the unit's dimensions.

The invention further relates to a sensor arrangement for sensing a relative kinematic state of a magnet and a Hall-effect sensor with respect to each other. The Hall-effect sensor has a Hall plate and is accommodated in a surface-mount device. The magnet is configured for generating a magnetic field having an orientation primarily parallel to the Hall plate. The sensor arrangement comprises magnetic-field collecting means for changing the orientation of the magnetic field to be primarily perpendicular to the Hall plate.

In an embodiment of the sensor arrangement, the magnet is located in a first plane, the magnetic-field collecting means is located in a second plane parallel to the first plane, and the Hall-effect sensor is located in a third plane between the first and the second planes.

In a further embodiment, the sensor arrangement is physically integrated with a through-shaft bearing unit.

Summarizing, the magnetic field as sensed by a Hall-effect sensor needs to have a specific orientation at the location of the Hall-effect sensor. The required orientation depends on whether the Hall-effect sensor is of the through-hole type or of the SMD type. The orientation for use with one type differs from the orientation for use with the other type by 90°. A design of a sensor arrangement that is based on through-hole Hall-effect sensors can be readily adapted to the use of Hall-effect sensors of the SMD type, and vice versa, by means of introducing magnetic-field collecting means so as to change the direction of the magnetic field lines over 90°. The other components of the design can then be re-used and the form-factor of the sensor arrangement can be largely maintained.

BRIEF DESCRIPTION OF THE DRAWINGS

The invention is explained in further detail, by way of example and with reference to the accompanying drawings, wherein.

Throughout the Figures, similar or corresponding features are indicated by same reference numerals.

DETAILED EMBODIMENTS

Figure 1:
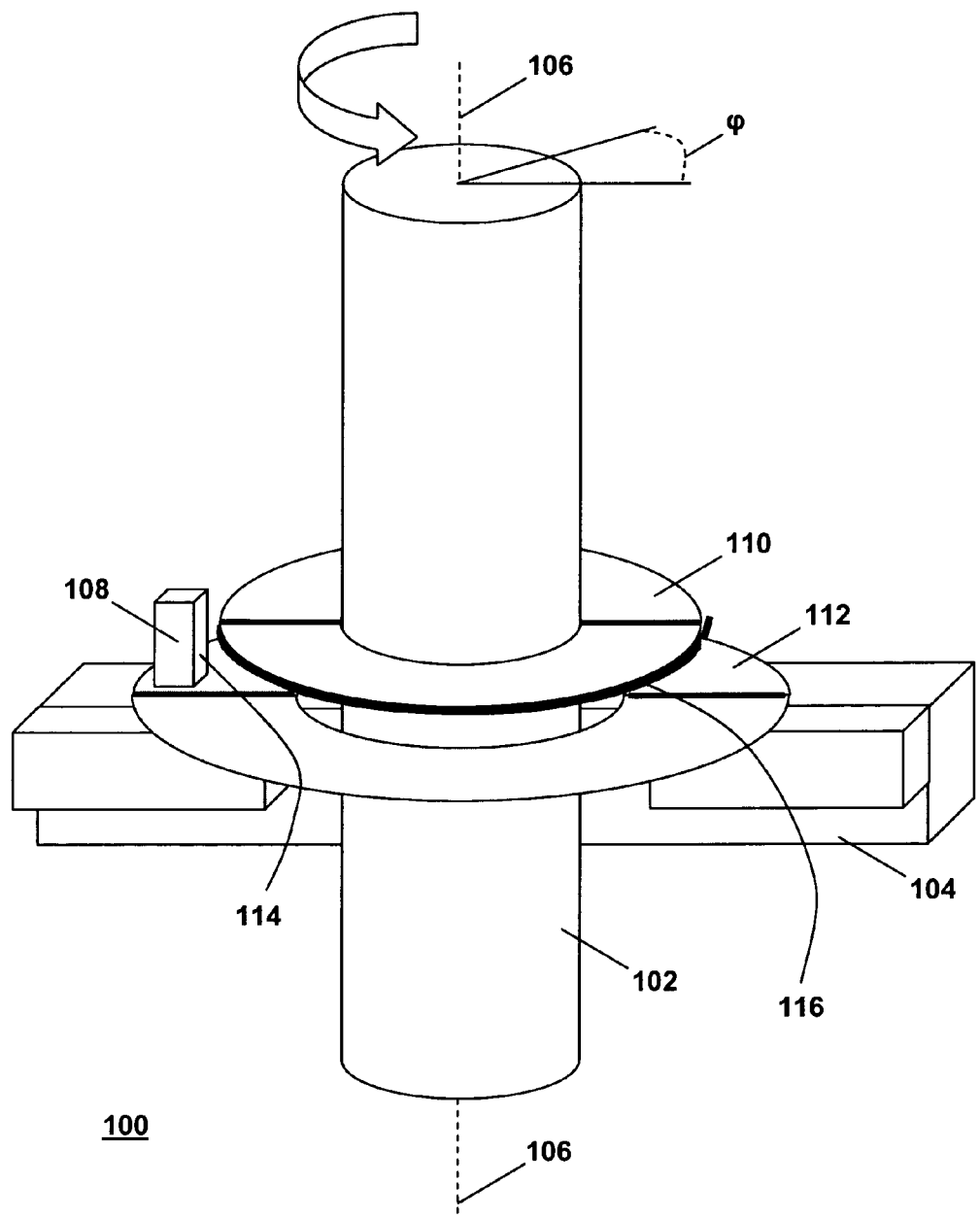
FIG. 1 is a diagram of a conventional apparatus wherein the rotation angle of a shaft is measured.

FIG. 1 is a diagram of a conventional apparatus 100 comprising a first component 102 and a second component 104 that are moveable with respect to one another. The conventional apparatus 100 is referred to herein below as "the first apparatus 100". In the example shown, the first component 102 comprises a shaft. The shaft 102 can be rotated around its axis 106 with respect to the second component 104 that is kept stationary. The first apparatus 100 further comprises a sensor arrangement for sensing the amount of rotation of the shaft 102 relative to the stationary second component 104. The sensor arrangement comprises a magnetic ring 110, which is located coaxially with, and attached to, the shaft 102. The sensor arrangement further comprises one or more Hall-effect sensors, e.g., a Hall-effect sensor 108, that are accommodated at the stationary second component 104. The Hall-effect sensor 108 in the first apparatus 100 is of the through-hole type and is soldered to a substrate 112 attached to the stationary second component 104.

The magnetic ring 110 is configured for generating a magnetic field whose relevant part has an orientation primarily parallel to the plane of the magnetic ring 110 i.e. a radial field parallel to the substrate 112. The magnetic ring 110 is, for example, a diametrically magnetized bipolar ring. Such a magnetized ring 110 is made of e.g. a thermoplastic filled with magnetized particles. A sensitive area 114 (i.e. the Hall plate) of the Hall-effect sensor 108 faces an outer circumference 116 of the magnetic ring 110. Note that the plane of the magnetic ring 110 intersects the Hall-effect sensor 108. That is, the Hall-effect sensor 108 is positioned within the plane of the magnetic ring 110 to intercept the radial magnetic field.

Assume now that the shaft 102 is rotated around its axis 106 over an angle of a particular magnitude φ, starting from a reference angular position. Then, the magnetic ring 110 rotates with the shaft 102 over the same angle φ in the plane of the magnetized ring 110. The rotation causes the magnetic field of the magnetized ring 110, as sensed by the Hall-effect sensor 108, to change with angular position. As a result, the angle of rotation of the shaft 102 can be derived from the output signal of the Hall-effect sensor 108. Optionally, the rate of change of the output signal is then representative of the angular velocity of the shaft 102.

Absolute-angle decoders, whose operation is based on Hall-effect sensors, are known in the art and need not be discussed here in further detail. The stationary second component 104 comprises e.g. a support (not shown) for maintaining the axis 106 of the shaft 102 in a fixed spatial orientation, using, for example, a ball bearing assembly, of which an inner ring is fixed to the shaft 102 and an outer ring is fixed to the stationary second component 104. The Hall-effect sensor 108 and the magnetic ring 110 can be physically integrated with a bearing unit. For more background on sensor-bearing units of SKF see, e.g., the "General Catalogue" of SKF, edition 2005, chapter "Mechatronics", section "Sensor-Bearing Units", and U.S. Pat. No. 6,043,643 mentioned above.

Figure 2:
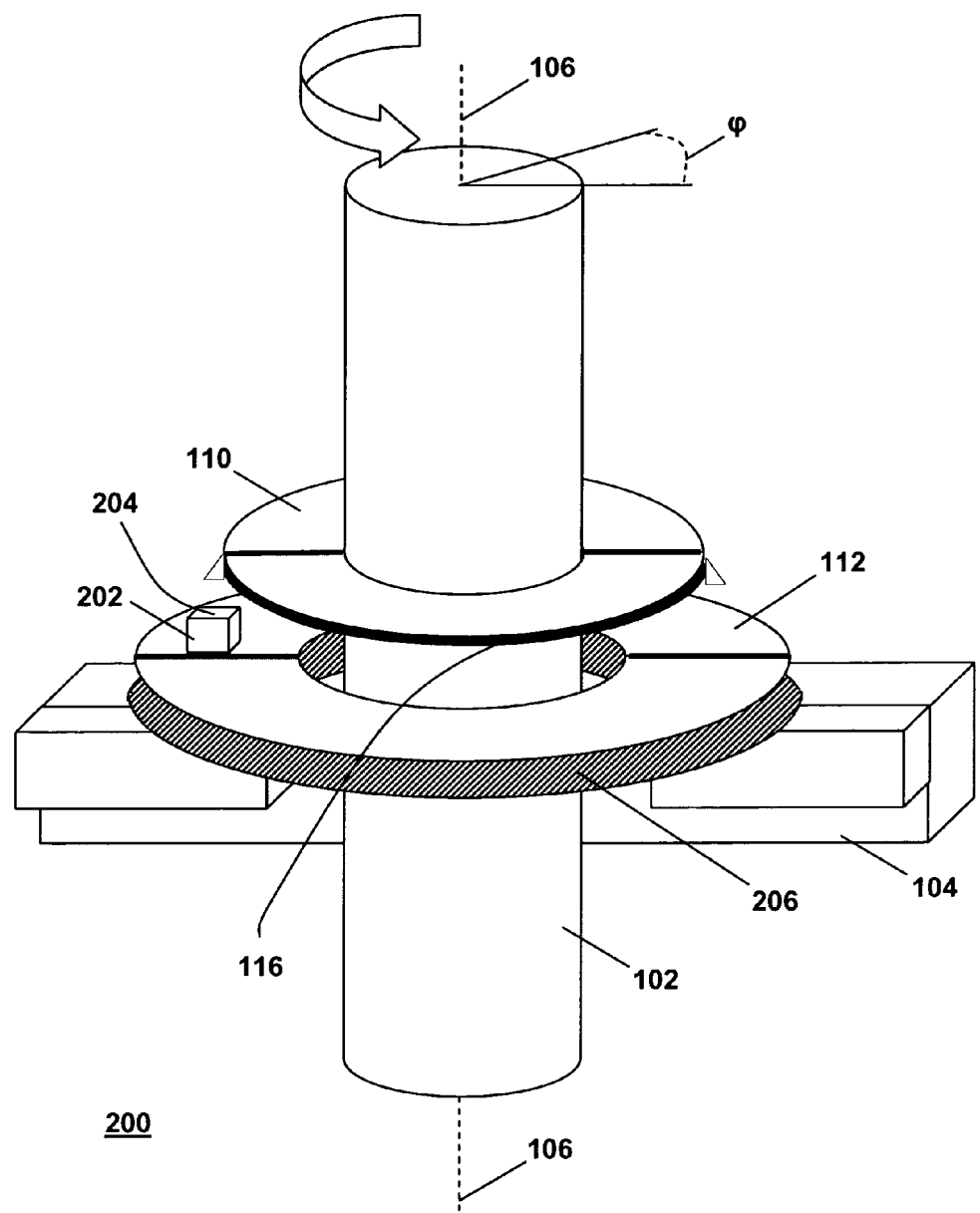
FIG. 2 is a diagram of an apparatus in the invention, wherein the rotation angle of the shaft is measured.

FIG. 2 is a diagram of an apparatus 200 according to the invention, referred to herein as "the second apparatus 200". The second apparatus 200 has elements that are identical to those of the first apparatus 100 discussed above. However, the second apparatus 200 differs from the first apparatus 100 in the following respects. Instead of the through-hole Hall-effect sensor 108 of the first apparatus 100, the second apparatus 200 has a Hall-effect sensor 202 of the SMD-type, mounted on the substrate 112. A sensitive area (or: the Hall-plate) 204 of the SMD-type Hall-effect sensor 202 is oriented parallel to the substrate 112. The second apparatus 200 according to the invention also differs from the first apparatus 100, in that the second apparatus 200 has magnetic-field collecting means 206, made of a material that has a high relative magnetic permeability $\mu_r$, examples of which have been mentioned earlier. The magnetic-field collecting means 206 serves to change the direction of the magnetic-field lines from a radial orientation to an axial orientation, at least at the location of the SMD-type Hall-effect sensor 202. The magnetic-field collecting means 206 in the second apparatus 200 is shaped as a disc with a central opening, located such that the Hall plate 204 of the Hall-effect sensor 202 lies in a plane between the disc 206 and the magnetic ring 110.

Preferably, the Hall plate of the SMD-type Hall-effect sensor 202 is mounted as close as possible to the magnetic-field collecting means 206, in this example the disc 206 with a central hole and made of a ferritic steel. A first distance between the Hall plate and the disc 206 is then on the order of 1 mm or less. The disc 206 preferably has a radial dimension—the radial dimension referring to the difference between an outer and an inner diameter of the disc—that is larger than a corresponding dimension of the Hall plate. Furthermore, the radial dimension of the disc 206 is preferably three or four times larger than an axial gap between the Hall plate 204 and the magnetic ring 110.

The magnetic-field lines form closed loops, as described by Maxwell's equations. The actual path of such a loop depends on the reluctance of the physical materials present within the magnetic field. The density of the magnetic-field lines is highest at the path of least reluctance. The magnitude of the reluctance of a specific material is inversely proportional to the value of its relative magnetic permeability $\mu_r$. Accordingly, the magnetic-field collecting means 206 can be properly shaped and be made of a suitable material in order to concentrate the magnetic field at the location of the SMD-type Hall-effect sensor 202 and in order to have the magnetic-field assume a direction perpendicular to the Hall plate 204 of the SMD-type Hall-effect sensor 202. The strength of the magnetic field, as sensed by the SMD-type Hall-effect sensor 202, changes with the angular position of the magnetic ring 110. It is known in the art how to derive the angular position of the magnetic ring 110 from the sensed changes in the strength of the magnetic field, and this is not further discussed here.

Preferably, the sensor arrangement of the second apparatus 200 in the invention is contained within a cylindrical housing (not shown here) of a material with a high value of its relative magnetic permeability in order to shield the sensor arrangement from magnetic fields originating externally to the sensor arrangement, so as to maintain accuracy of the output signal of the sensor arrangement. The housing is also suitably made of a ferritic stainless steel such as AISI 430

FIG. 2 merely serves as an example to illustrate the principle of using the magnetic-field collecting means 206 in order to modify the orientation of the magnetic field at the location of the Hall-effect sensor 202 of the SMD type, in order to be able to re-use the design of a sensor arrangement, originally equipped with a Hall-effect sensor 108 of the through-hole type. The principle is equally effective when using a combination of multiple SMD-type Hall-effect sensors, or when using a magnetic ring having a radial multi-pole magnetic field.

Similarly, FIG. 2 illustrates the second apparatus 200 of the invention, wherein the second component 104 is kept stationary. The second component 104 carries the SMD-type Hall-effect sensor 202, the substrate 112 and the magnetic-field collecting means 206. If, instead, the first component 102, here the shaft 102, is kept stationary and the second component 104 is to rotate coaxially with the shaft 104, the magnetic ring 110 is preferably secured to the second component 104, whereas the SMD-type Hall-effect sensor 204, the substrate 112 and the magnetic field-collecting means 206 are secured to the shaft 102. This latter configuration facilitates the design with respect to communicating the signals generated by the SMD-type Hall-effect sensor 202 to the relevant signal-processing equipment (not shown), e.g. via a wired connection.

Figure 3:
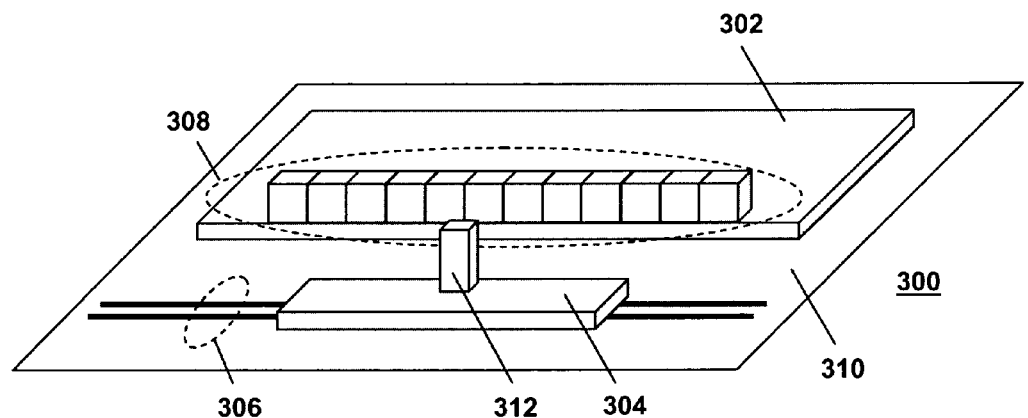
FIGS. 3 and 4 are diagrams illustrating an application of the invention to measuring a relative linear displacement.
Figure 4:
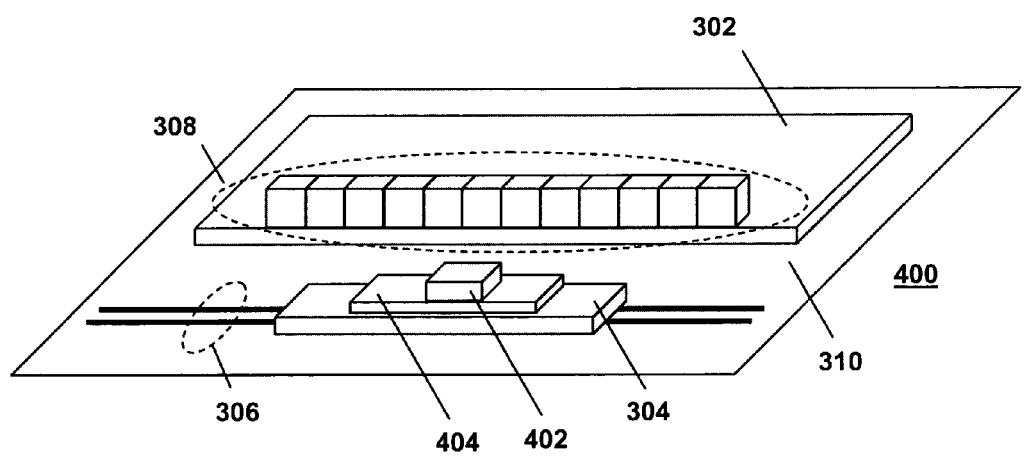

FIGS. 3 and 4 are diagrams of a third apparatus 300 and a fourth apparatus 400, respectively, illustrating that the principle is also applicable to a sensor arrangement for detecting the linear position, and/or linear velocity, and/or linear acceleration of two physical components relative to each other.

The third apparatus 300, shown in FIG. 3, comprises a first component 302 and a second component 304. The second component 304 can be moved linearly relative to the first component 302 along a path 306. The path 306 is drawn as being straight, but this is only by way of example. The third apparatus 300 comprises a sensor arrangement for supplying an output signal representative of the current position of the second component 304 relative to the first component 302. The sensor arrangement includes a linear magnetic array 308, e.g., a Halbach array. As known, a Halbach array is a particular configuration of permanent magnets that reinforces the strength of the magnetic field on one side of the array while reducing the magnitude of the field to almost zero on the other side of the array. This is brought about by rotating the pattern of the magnetic field of a permanent magnet in the array relative to the next permanent magnet in the array. A significant portion of the resulting magnetic field has its field lines primarily running parallel to a reference plane 310.

The second component 304 accommodates a Hall-effect sensor 312 of the through-hole type, having its Hall plate (not shown) facing the magnetic array 308. When the second component 304 moves along the path 306, the output of the Hall-effect sensor 312 is representative of the current position of the second component 304 relative to the magnetic array 308 and, therefore, of the current position of the second component 304 with respect to the path 306.

The fourth apparatus 400 differs from the third apparatus 300 in that the through-hole Hall-effect sensor 312 has been replaced by a Hall-effect sensor 402 in an SMD package. In the third apparatus 300, the Hall plate of the Hall-effect sensor 312 of the though-hole type was facing the magnetic array 308. In the fourth apparatus 400, the Hall plate of the SMD-type Hall-effect sensor 402 now faces upward (or downward) in FIG. 4, i.e., the Hall plate has an orientation parallel with the reference plane 310. The fourth apparatus 400 further differs from the third apparatus 300 in that magnetic-field collecting means 404 is present underneath the Hall-effect sensor 402 of the SMD-type. The magnetic-field collecting means 404 is made of a material that has a high relative magnetic permeability $\mu_r$, examples of which have been mentioned earlier. The magnetic-field collecting means 404 serves to change the direction of the magnetic-field lines from an orientation substantially parallel to the reference plane 310 to an orientation substantially perpendicular to the reference plane 310 at the current location of the Hall-effect sensor 402 of the SMD-type. Again, note that many of the elements of the third apparatus 300 are re-used in the fourth apparatus 400 and that the form-factor of the third apparatus 300 can be retained.

Preferably, the sensor arrangement of the fourth apparatus 400 is contained within a housing (not shown here) of a material with a high value of its relative magnetic permeability $\mu_r$ in order to shield the sensor arrangement from magnetic fields originating externally to the sensor arrangement, so as to maintain accuracy of the output signal of the sensor arrangement.

Figure 5:
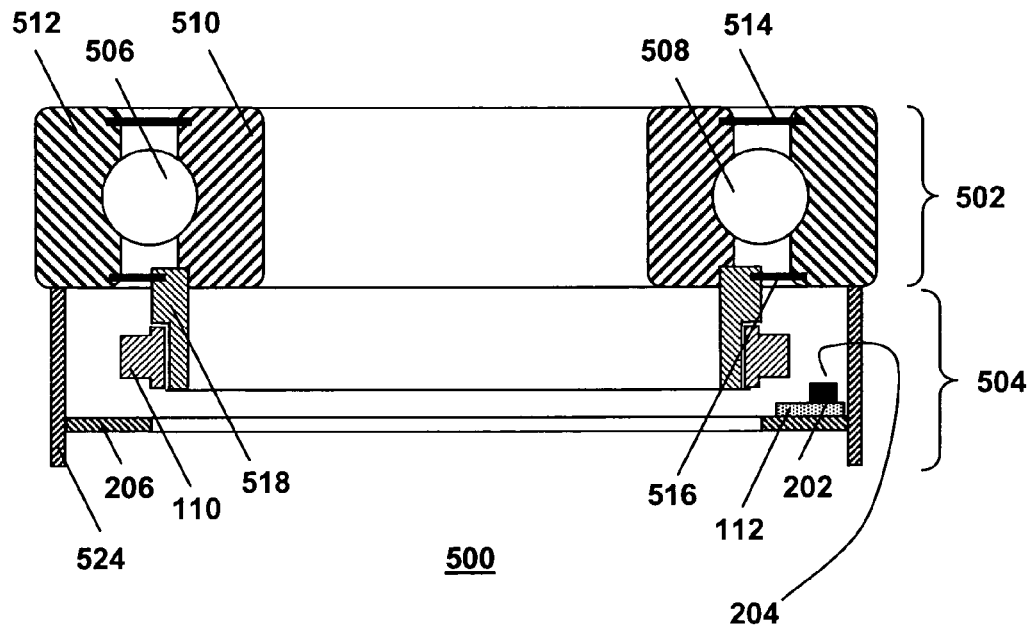
FIGS. 5 and 6 are diagrams illustrating sensor-bearing units in the invention.

FIG. 5 is a diagram in cross-section of a module 500, wherein the sensor arrangement of the second apparatus 200 has physically been integrated with a rolling element bearing 502. In the diagram of FIG. 5, the sensor arrangement is indicated with reference numeral 504.

The rolling element bearing 502 comprises multiple rolling elements, among which are rolling elements 506 and 508, disposed between an outer surface of a bearing inner ring 510 and an inner surface of a bearing outer ring 512. Typically, the rolling elements are held by a cage (not shown). The rolling elements enable the inner ring 510 and the outer ring 512 to rotate coaxially with respect to one another in a low-friction manner. A first seal 514 and a second seal 516 prevent dirt from reaching the rolling elements and prevent lubricants, held in the space between the inner ring 510 the outer ring 512, from escaping. In the configuration of the second apparatus 200 of FIG. 2, the inner ring 510 is secured to the shaft 102, whereas the outer ring 512 is secured to the stationary component 104.

The sensor arrangement 504 comprises a cylindrical holder 518 coaxially located relative to the rolling element bearing 502. The holder 518 carries on its radially outer surface the magnetic ring 110. The cylindrical holder 518 is attached to a rotating part of the rolling element bearing 502, i.e. to the inner ring 510. The sensor arrangement 504 further comprises an assembly of the magnetic-field collecting means 206, here in the form of a metal disc, and a metal cylinder 524, located coaxially with the rolling element bearing 502. The metal disc 206 and the metal cylinder 524 have been attached to each other through e.g. welding. Both the metal disc 206 and the metal cylinder 524 are of a material that has a high relative magnetic permeability $\mu_r$. The metal cylinder 524 is secured to a non-rotating part of the rolling element bearing 502, i.e. to the outer ring 512. The sensor arrangement 504 further comprises the Hall-effect sensor 202 of the SMD-type, located on a surface of the metal disc 206 that faces the rolling element bearing 502. The Hall-effect sensor 206 is mounted on a board 112 of e.g. a PCB-on-steel type.

Figure 6:
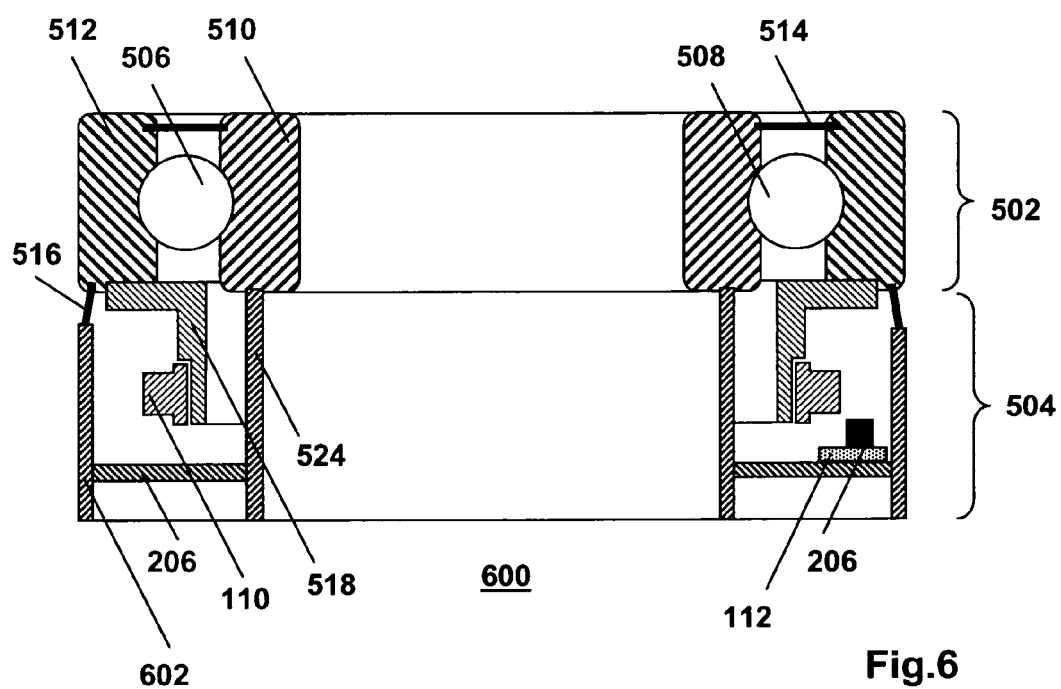

FIG. 6 is a diagram in cross-section of a module 600, wherein the sensor arrangement 504 has physically been integrated with the rolling element bearing 502. The configuration of the module 600 differs from the configuration of the module 500, in that the module 600 is designed for applications, wherein the inner ring 510 is attached to a stationary, non-rotating, first part (not shown) and the outer ring 512 is attached to a rotating second part (not shown). For ease of reference, the module 600 is designed for an application wherein the shaft 102 is fixed with respect to an inertial frame of reference and wherein the component 104 is designed for rotating around the shaft 102.

The cylindrical holder 518 carries on its radially outer surface the magnetic ring 110. The cylindrical holder 518 is attached to the rotating part of the rolling element bearing 502, i.e. to the outer ring 512. The sensor arrangement 504 of the module 600 further comprises an assembly of the magnetic-field collecting means 206, here in the form of a metal disc, and the metal cylinder 524. The metal disc 206 and the metal cylinder 524 have been attached to each other through e.g. welding. Both the metal disc 206 and the metal cylinder 524 are of a material that has a high relative magnetic permeability $\mu_r$. The metal cylinder 524 is secured to the non-rotating part of the rolling element bearing 502, e.g., to the inner ring 510. A further metal cylinder 602 is attached to the metal ring 206, and acts as a shield against external magnetic fields. A seal 516 is suitably accommodated between the further metal cylinder 602 and the outer ring 516, or between the further metal cylinder 602 and an axially outer side face of the metal cylinder 518.

In above examples of the invention, the magnetic-field collecting means 206, 404 is shown as mounted stationary with respect to the Hall-effect sensor 204, 402 of the SMD-type. It is clear that, as a functional alternative, the magnetic-field collecting means 206, 404 can be mounted so as to be moveable with respect to the Hall-effect sensor 204, 402 of the SMD-type.

Furthermore, the SMD-type Hall-effect sensor 206, 404 could be enclosed in a cover made of, for example, austenitic stainless steel (e.g., AISI 316) or another suitable non-magnetic material so as to enable the apparatus 200, 400 to operate in a chemically aggressive environment.

The invention claimed is:
1. An apparatus comprising a first physical component, a second physical component and a sensor arrangement for sensing a relative kinematic state of the first and second components with respect to each other, wherein the sensor arrangement comprises a magnet that is stationary with respect to the first physical component, and at least one Hall-effect sensor that are stationary with respect to the second physical component;

each of the at least one Hall-effect sensor is an electronic surface-mount device Hall-effect sensor and has a Hall plate;

the magnet is configured for generating a magnetic field having an orientation primarily parallel to the Hall plate; and the sensor arrangement comprises a magnetic-field collecting means for changing the orientation of the magnetic field to be primarily perpendicular to the Hall-plate at a location of the at least one Hall-effect sensor, the magnetic-field collecting means comprising of only a single component, the magnet defines a first plane, the magnetic-field collecting means defines a second plane, the first plane and the second plane being planar parallel and spaced apart, and the at least one Hall-effect sensors being located on a substrate that defines a third plane that is positioned between the first plane and the second plane, the magnet, the substrate and the magnetic-field collecting means each having a central opening that the first physical component passes through such that the first physical component is surrounded by the magnet, the substrate, and the magnetic-field collecting means and the first physical component intersects and traverses the first plane, the second plane, and the third plane, the magnetic-field collecting means and the at least one Hall-effect sensor being stationary with respect to each other.

2. The apparatus of claim 1, wherein:

the first physical component comprises a shaft that is rotatable around its axis relative to the second physical component;

the first plane and the second plane are perpendicular to the axis of the first physical component; and the sensor arrangement is physically integrated with a through-shaft bearing unit mechanically coupling the shaft to the second physical component.

3. A sensor arrangement for sensing a relative kinematic state of a magnet and a Hall-effect sensor with respect to each other, wherein:

the Hall-effect sensor is a surface-mount device Hall-effect sensor and has a Hall plate;

the magnet is configured for generating a magnetic field having an orientation primarily parallel to the Hall plate; and the sensor arrangement comprises a magnetic-field collecting means for changing the orientation of the magnetic field to be primarily perpendicular to the Hall plate, the magnet defines a first plane, the magnetic-field collecting means defines a second plane, the first plane and the second plane being planar parallel and spaced apart, and the Hall-effect sensor being located on a substrate that defines a third plane that is positioned between the first plane and the second plane, wherein the magnet, the substrate and the magnetic-field collecting means each being discs having a central opening configured for a shaft to pass through such that the shaft is surrounded by the magnet, the substrate, and the magnetic-field collecting means such that the shaft intersects and traverses the first plane, the second plane, and the third plane, wherein the substrate and the magnetic-field collecting means are configured to be fixed relative to each other.

4. The sensor arrangement of claim 3, physically integrated with a rolling element bearing such that the sensor arrangement senses a relative kinematic state of an inner ring and an outer ring of the bearing.

\* \* \* \* \*